United States Patent

Roza et al.

[15] 3,665,344

[45] May 23, 1972

[54] SELF-OSCILLATING VOLTAGE CONVERTER

[72] Inventors: Engel Roza; Herman J. G. M. Benning; Anthonius J. J. C. L. Lommers, all of Emmasingel, Eindhoven, Netherlands

[73] Assignee: U.S. Philips Corporation, New York, N.Y.

[22] Filed: Aug. 22, 1969

[21] Appl. No.: 852,398

[30] Foreign Application Priority Data

Aug. 22, 1968 Netherlands..........................6812023

[52] U.S. Cl. ............................331/116 R, 331/75, 331/159

[51] Int. Cl. ..........................................................H03b 5/36

[58] Field of Search..........................................331/116, 159

*Primary Examiner*—John Kominski

*Attorney*—Frank R. Trifari

[57] ABSTRACT

A self-oscillating voltage converter including a pair of complementary transistors connected in single-ended push-pull configuration without the use of a transformer. The first transistor is shunted by a piezo-electric two-terminal device in series with a relatively large capacitor, across which an output alternating voltage at the resonant frequency of the device is produced and fed back to both transistors through an R-C network.

6 Claims, 5 Drawing Figures

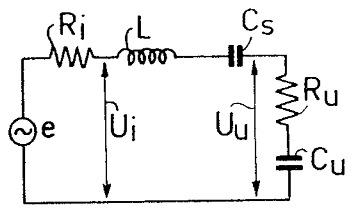
fig.1
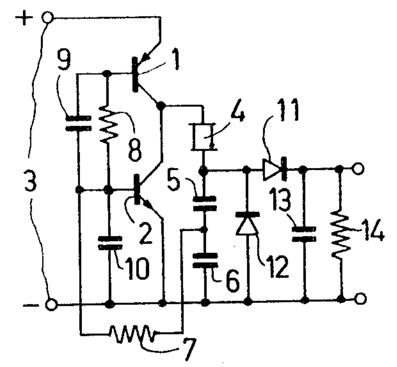
fig.2
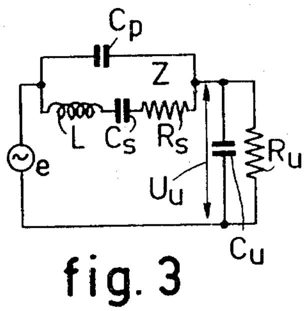
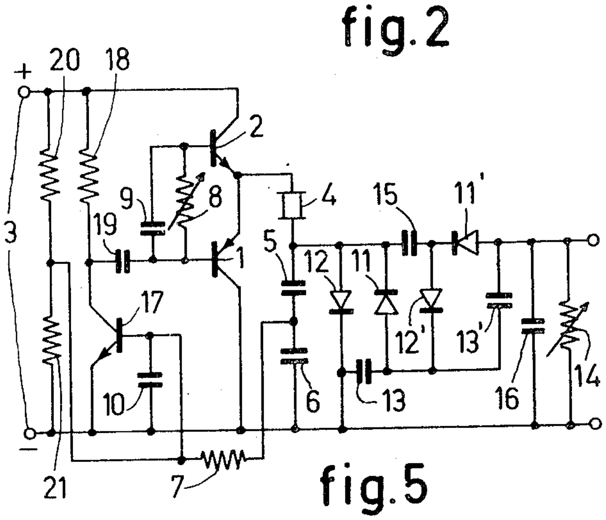
fig. 3 fig.5
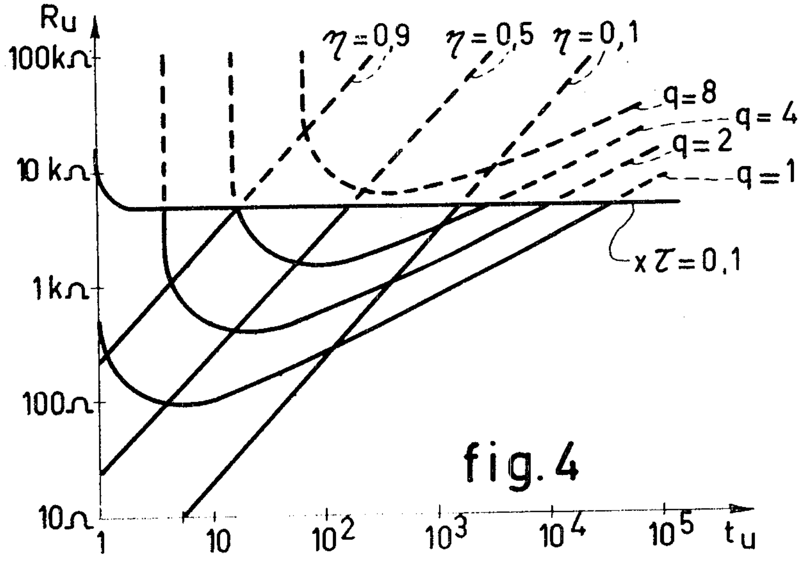
fig.4
INVENTORS
ENGEL ROZA
HERMAN J.G.M. BENNING
ANTHONUS J.J.C. LOMMERS
BY
AGENT

SELF-OSCILLATING VOLTAGE CONVERTER

The invention relates to a self-oscillating voltage converter, having a pair of complementary transistors connected in single-ended push-pull. It is an object of the invention to provide a converter which does not include a transformer and/or inductance and hence can readily be manufactured in integrated form and particularly is very suitable for biassing tuning diodes the capacitance of which varies as a function of the applied bias voltage in a signal receiver with a direct voltage obtained by rectification of the alternating voltage produced.

The self-oscillating voltage converter according to the invention is characterized in that the main current electrode path of a first transistor of the pair of complementary transistors is shunted by the series connection of a piezo-electric two-terminal device and a capacitance which is large relative to the series capacitance of this two-terminal device and across which an output alternating voltage at the series resonant frequency of the two-terminal device is produced, and in that at least part of this output alternating voltage is returned as a feedback voltage to the bases of both transistors of the pair through an RC network.

It should be mentioned that it is known from the French Pat. specification No. 1,190,652 to step up an alternating voltage having a given frequency by means of a piezo-electric element resonant at this frequency. However, the element used in the French Pat. specification is provided with two input electrodes and at least one separate output electrode and hence is not a two-terminal device. In addition, the French patent specification does not teach how a self-oscillating converter may be made by means of such a piezo-electric element.

The second transistor of the pair of complementary transistors may be replaced by a normal resistor, however, the power dissipated in this resistor will greatly reduce the efficiency of the converter and will make it substantially impossible to manufacture the converter as an integrated circuit. By the use of a single-ended push-pull circuit including two complementary transistors these disadvantages are obviated and with this circuit the absence of a direct-current path through the piezo-electric element does not give rise to difficulty.

The invention will now be described more fully with reference to the accompanying drawings, in which FIG. 1 is an equivalent circuit diagram illustrating the principle on which the converter according to the invention is based;

FIG. 2 is a circuit diagram of a first embodiment;

FIG. 3 is an equivalent circuit diagram in greater detail illustrating the operation of the converter according to the invention;

FIG. 4 is a graph for determining the possible output voltage and power; and

FIG. 5 is the circuit diagram of a second embodiment.

When an alternating-voltage source $e$ having an internal resistance $R_i$ (FIG. 1) is connected to a series resonant circuit having a natural frequency equal to the frequency of the voltage $U_i$ produced by the voltage source and this circuit $L$-$C_s$ is terminated by the series combination of a capacitance $C_u$ and a resistor $R_u$, there may be produced across the terminating impedance $1/j\omega C_u + R_u$ a voltage $U_u$ higher than the impressed voltage $U_i$ —. At the resonance of the series circuit:

$$\frac{|U_u|}{|U_i|}=\frac{|Z_u|}{R_u}$$

The terminating impedance $Z_u$ may also be constituted by the parallel combination of a capacitor $C_u$ and a load resistor $R_u$.

The converter according to the invention is based on a similar known voltage increase by means of a series resonant circuit. The embodiment shown in FIG. 2 includes two transistors 1 and 2 connected in single-ended push-pull. The transistor 1 is of the p-n-p type and its emitter is directly connected to the positive terminal of a direct-voltage supply source 3. Its collector is directly connected to that of the other transistor 2 of the n-p-n type, and the emitter of this transistor is directly connected to the negative terminal of the source 3. When an alternating voltage is applied to the base of the amplifier comprising the transistors 1 and 2, this amplifier behaves as an alternating voltage generator, ($e$ in FIG. 1) one of the output terminals of which is constituted by the collector connection of the two transistors 1 and 2 and the other output terminal of which is formed by one of the terminals of the supply source 3.

One terminal of a piezo-electric two-terminal device, more particularly a ceramic resonator 4, is connected to the collector connection of the transistors 1 and 2, and the other terminal of this resonator is connected to the negative terminal of the source 3 through a capacitive voltage divider comprising two series connected capacitors 5 and 6. The resonator 4 forms the series circuit $L$-$C_s$ of FIG. 1, and the capacitance $C_5 \cdot C_6/Cz\ C_6$ of the voltage divider is the capacitance $C_u$ of this circuit.

From the tapping on the voltage divider 5, 6 a feedback voltage is applied through a series resistor 7 to the base of the transistor 2 and, through a further resistor 8 shunted by a capacitor 9, to the base of the transistor 1. The base of the transistor 2 is connected to the emitter of this transistor through a small capacitor 10 which materially reduces the amplification of frequencies higher than the natural frequency of the resonator 4.

A parallel load resistance $R_u$ is constituted by a rectifier in voltage doubling connection comprising a series diode 11, a parallel diode 12 and a charging capacitor across which is connected the load resistor 14 proper. Under these conditions, $$R_u = R_{14}/2 \times 2^2 = R_{14}/8$$

In the circuit diagram shown in FIG. 3 the equivalent circuit of the resonator 4 is shown in greater detail. In addition to a series circuit $L$-$C_s$ this equivalent circuit includes an internal damping resistance $R_s$ and a parallel capacitance $C_p$. Further, the load resistance $R_u$ is connected in parallel with the output capacitance $C_u$ instead of in series therewith. If now, $\omega\ C_u\ R_u = \tau_u$, then $R_u/1 + \tau_u^2$ is the value of the series resistance corresponding to the parallel resistance $R_u$, and $\tau_u \cdot R_u/1 + \tau_u^2$ is the impedance of the series capacitance corresponding to the parallel capacitance $C_u$.

The ratio between output voltage and input voltage is $$q=\frac{|U_u|}{e}=\frac{|Z_u|}{|Z+Z_u|}.$$

The admittance $1/Z$ of the resonator 4 is: $j\ \omega\ C_p + 1/R_s(1+jx)$, where $x=(\omega/\omega_o-\omega_o/\omega)\ Q_o$, where $$\omega_o=\frac{1}{\sqrt{LC_s}} \text{ and } Q_o=\frac{1}{R_s}\sqrt{\frac{L}{C_s}}$$

and the impedance $Z$ is:

$$\frac{R_s}{(1-x\cdot\tau)^2+\tau^2}\,[1+j(x-x^2\tau-\tau)]$$

with $\tau=\omega C_p R_s$. On the other hand $$|Z_u| = \frac{R_u}{\sqrt{1+\tau_u^2}}, \text{ where } \tau_u=\omega C_u R_u, \text{ from which:}$$

$$q=\frac{R_u}{\sqrt{1+\tau_u^2}\sqrt{\left(\frac{R_s}{(1-x)^2+{}^2}+\frac{R_u}{1+\tau_u^2}\right)^2+\left(\frac{R_s(x-x^2\tau-\tau)}{(1-\tau x)^2+\tau^2}-\frac{\tau_u R_u}{1+\tau_u^2}\right)^2}}$$

Within the range in which $x\tau$ is much smaller than 1 this expression may be reduced to:

$$q=\frac{R_u}{\sqrt{1+\tau_u^2}\sqrt{\left(R_s+\frac{R_u}{1+\tau_u^2}\right)^2+\left(R_sx-\tau R_s-\frac{\tau_uR_u}{1+\tau_u^2}\right)^2}}$$

The build-up $q$ then has a maximum at a frequency determined by the equation:

$$x=\frac{\tau_uR_u}{(1+\tau_u^2)R_u}+\tau.$$

This maximum value is equal to $$q_{\max}=\frac{R_u}{\sqrt{1+\tau_u^2}\left(R_s+\frac{R_u}{1+\tau_u^2}\right)}$$

By taking $t_u=1+\tau_u^2$ as a new variable the above equation becomes:

$$q_{\max}=\frac{R_u\sqrt{t_u}}{R_st_u+R_u}$$

and from this we get the equation:

$$t_u^2(q^2R_s^2)+t_u(2R_uR_sq^2-R_u^2)+q^2R_u^2=0$$

which holds as long as $x\tau<<1$.

Using this equation, in the diagram of FIG. 4 there have been drawing in a $R_u-\tau_u$ plane lines of constant build-up $q$ ($q$ = 8, 4, 2 and 1) for a resonator having a natural frequency $f_o=\omega_o/2\pi=452$ kHz, an internal damping resistance $R_s$ of 24 Ω and a parallel capacitance of 175 pF. The dotted parts of the $q$ lines lie in the region where $x\tau$ is greater than 0.1 and in which deviations occur which increase with increasing $x\tau$.

In a converter not only the build-up but also the efficiency $\eta$ is important, i.e. the ratio between the power supplied to the load resistance and the entire input power:

$$\eta=\frac{R_u}{R_st_u+R_u},$$

and hence $$R_u=\frac{\eta}{1-\eta}R_s\cdot t_u:$$

in the $R_u-t_u$ plane lines of constant efficiency are straight lines ($\eta$ = 0.9, 0.5 and 0.1) and of these the portions lying in the range $x\tau>0.1$ are also shown in dotted lines.

A final important feature of a converter is the power transfer. This is $P=q^2\cdot e^2/R_u=pe^2$ and it can be shown that in the $R_u-t_u$ plane lines of constant specific power $p$ are also straight lines so that there is a relationship between $p$ and $\eta$ which can be expressed by the equation:

$$\eta=\frac{2R_sp}{1-\sqrt{1-4R_sp}}.$$

In a practical embodiment including the above mentioned ceramic resonator having a natural frequency of 452 kHz, a $R_s$ of 24 Ω a $C_p$ of 175 pF an $L$ of 8.5 mH and a $C_s$ of 14.5 pF and a rectifier in voltage quadrupling connection, the following elements were used:

Transistor 1 = Philips BC 179,
Transistor 2 = Philips BC 107,
Diodes 11, 12 and 11', 12' (FIG. 5) = Philips AA 119.
Capacitors:
5 = 560 pF,
6 = 5,100 pF,
9 = 4,700 pF,
10 = 470 pF,
13, 13', 15 and 16 (FIG. 5) each = 4,700 pF.

Further, a capacitor of 1,500 pF was connected between the collectors of the transistors 1 and 2 and the negative terminal of the source 3.

Resistors:
7 = 1 kΩ.
8 = 1 MΩ, variable.
14 = 220 kΩ, variable.

Thus, the maximum value of $R_u$ was $$R_{14}/2\times 4^2=6.9\ k\Omega.$$

With a direct supply voltage of 3 volts, this converter delivered a voltage of 26.5 volts across the resistor 14. The current absorbed was 3 mA, so that the efficiency was $$\eta'=\frac{\pi}{4}=\frac{26.5^2}{220{,}000\times 3\times 3\times 10^{-3}}=35.5\%$$

In the second embodiment the circuit diagram of which is shown in FIG. 5, the emitters of the transistors 1 and 2 are connected to one another and to the resonator 4, while the collector of the transistor 1 is directly connected to the negative terminal of the supply source 3 and the collector of the transistor 2 is directly connected to the positive terminal. This provides the advantage that the amplifier stage including the transistors 1 and 2 is substantially insensitive to spreads differences and/or changes of the respective current gain factors of these transistors. On the other hand, to satisfy the self-oscillation conditions an inversion of the voltage and an amplification of the voltage between the tapping on the capacitive voltage divider 5, 6 and the bases of the transistors 1 and 2 is required. This is performed by a third transistor 17, for example of the n-p-n type, operating in common emitter configuration. The emitter of this transistor is directly connected to the negative terminal of the supply source 3 and its collector is connected to the positive terminal of this source through a load resistor 18 and is coupled with the bases of the transistors 1 and 2 by a capacitor 19. The base of the transistor 17 is connected to the tapping on the voltage divider 5, 6 through the resistor 7 of the feedback circuit and to the negative terminal of the supply source 3 through a decoupling capacitor 10. This base is also connected to the tapping on a resistive voltage divider 20, 21 connected between the terminals of the supply source 3, so that the transistor 17 is sufficiently biassed in the forward direction to operate in class A and to drive the transistors 1 and 2 without detecting the part of the alternating voltage produced which is fed back to its base.

The converters described provide the advantage that they do not include any transformer and/or inductance so that they can be manufactured as integrated circuits and, with the exception of the resonator 4, even as monolithic circuits, so that they occupy little room and are light. They are particularly suitable for producing a direct voltage for biassing tuning diodes or varicaps of a radio or television receiver. In such use, the biassing voltage must be stabilized and be readily variable. The current consumption of the varicaps is negligibly small so that the load of the converter is substantially constituted by the voltage stabilizer and regulator, which compares a variable part of the output voltage with a stable reference voltage.

Alternatively, the value of the direct voltage supplied by the source 3 may be varied and/or stabilized, which would result in a better joint efficiency $\eta$ of the stabilizer regulator and of the converter.

The efficiency $\eta'$ = 35 % of the practical embodiment described may considerably be improved. For example, with the resonator described at a slightly smaller build-up $q$ of 4 an $\eta$ of 0.9 (FIG. 4) is obtained. This corresponds to a $\eta'=0.9\times\pi/4=0.71$ reduced by:

a. additional power lossed in the resonator 4 by exceeding the limits of the operating range in which the resonator obeys Hooke's law;

b. incorrect B-adjustment of the amplifier, for which adjustment the factor of the conversion of direct-current energy into alternating-current energy is equal to $\pi/4$, c. rectification losses.

Hence an overall $\eta'$ of about 0.6 would appear to be attainable.

For this purpose, a resonator 4 having a maximum ratio $C_s/C$ is preferably used while retaining the same $R_s$ and $Q_o$; as a result, in FIG. 4 the boundary $x = 0.1$ is shifted upwards so that greater build-ups $q$ become possible while retaining the same efficiency $\eta$. In addition, the relationship between the specific power $p$ and the efficiency $\eta'$ proves that with a given ratio $C_s/C_p$, a given $Q_o$ and a given value of $p$ a comparatively large value of $R_s$ is of advantage.

Finally, with respect to the biassing of varicaps it is of advantage to chose a resonator of which neither the natural frequency nor the upper harmonics fall within one of the frequency bands of the receiver tuned by means of these varicaps, for example, a natural frequency of 28 MHz for a normal radio receiver. Thus, no screening of the converter is required, since the resonator cannot radiate to the surroundings of the receiver.

What is claimed is:

1. A voltage converter including a pair of complementary transistors connected in single-ended push-pull, characterized in that the main current electrode path of a first of these transistors is shunted by the series connection of a piezo-electric two-terminal device and of a capacitance which is large relative to the series capacitance of this two-terminal device and across which an output alternating voltage at the series resonant frequency of the two-terminal device is produced and in that at least part of this output alternating voltage is returned through an R-C network as a feedback voltage to the bases of the two transistors.

2. A converter as claimed in claim 1, characterized in that the piezo-electric two-terminal device is a ceramic resonator.

3. A converter as claimed in claim 1, characterized in that the said large capacitance is that of a capacitive voltage divider from the tapping of which the feedback voltage is taken.

4. A converter as claimed in claim 1, characterized in that the R-C network includes a series resistor through which the feedback voltage is returned to the base of the first transistor, a parallel capacitor connected between the end of this series resistor remote from the piezo-electric two-terminal device and a point of constant potential, and a second resistor shunted by a second capacitor and connected between the bases of the two transistors.

5. A converter as claimed in claim 4, in which the piezo-electric two-terminal device is connected to the collectors of the two transistors, characterized in that the series resistor is directly connected between the large capacitance and the base of the first transistor.

6. A converter as claimed in claim 1 for biassing at least one tuning diode which has a capacitance which varies as a function of the biassing voltage applied in a signal receiver by a direct voltage obtained by rectification of the alternating voltage produced, characterized in that the series resonant frequency of the piezo-electric two-terminal device is chosen to be so high that this frequency and its upper harmonics fall outside the receiving frequency range or ranges of the signal receiver.

* * * * *

PO-1050
(5/69)

UNITED STATES PATENT OFFICE
CERTIFICATE OF CORRECTION

Patent No. 3,665,344 Dated May 23, 1972

Inventor(s) ENGEL ROZZA, HERMAN J.G.M.BENNING & ANTHONIUS J.J. C.L. LOMMERS

It is certified that error appears in the above-identified patent and that said Letters Patent are hereby corrected as shown below:

Column 2, line 23, change "$C_6$/Cz $C_6$" to --$C_6/C_5 + C_6$--.

Signed and sealed this 5th day of September 1972.

(SEAL)
Attest:

EDWARD M.FLETCHER,JR.
Attesting Officer

ROBERT GOTTSCHALK
Commissioner of Patents